United States Patent
Hart et al.

(10) Patent No.: US 10,382,311 B2
(45) Date of Patent: Aug. 13, 2019

(54) BENCHMARKING SERVERS BASED ON PRODUCTION DATA

(71) Applicant: Facebook, Inc., Menlo Park, CA (US)

(72) Inventors: Steven Richard Hart, Pleasanton, CA (US); Jiaxin Lu, Union City, CA (US); Darryl Edward Gardner, Newark, CA (US); Zhanhai Qin, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 514 days.

(21) Appl. No.: 14/861,740

(22) Filed: Sep. 22, 2015

(65) Prior Publication Data

US 2017/0085460 A1   Mar. 23, 2017

(51) Int. Cl.
*H04L 12/26* (2006.01)

(52) U.S. Cl.
CPC ............ *H04L 43/50* (2013.01); *H04L 43/045* (2013.01)

(58) Field of Classification Search
CPC .... G06Q 10/06311; G06Q 10/01; G06F 8/20; G06F 11/3664; G06F 8/70
See application file for complete search history.

(56) References Cited

U.S. PATENT DOCUMENTS

| | | | | |
|---|---|---|---|---|
| 5,303,166 A * | 4/1994 | Amalfitano | ......... | G06F 11/3428 702/186 |
| 6,467,024 B1 * | 10/2002 | Bish | .................... | G06F 11/2087 711/113 |
| 2005/0251574 A1 * | 11/2005 | Chagoly | ............. | G06F 11/3409 709/227 |
| 2009/0064087 A1 * | 3/2009 | Isom | ........................ | G06F 8/10 717/101 |
| 2009/0093997 A1 * | 4/2009 | Fluegge | ................. | G06Q 10/06 702/182 |
| 2010/0107146 A1 * | 4/2010 | Wrighton | ............ | G06F 11/3664 717/134 |
| 2013/0211918 A1 * | 8/2013 | Kwon | .................... | G06Q 30/02 705/14.64 |
| 2013/0268260 A1 * | 10/2013 | Lundberg | ................ | G06F 17/28 704/8 |
| 2014/0081616 A1 * | 3/2014 | Poulin | ................. | G06F 11/3457 703/22 |
| 2015/0020049 A1 * | 1/2015 | Caufield | ............. | G06F 11/3684 717/124 |
| 2015/0242297 A1 * | 8/2015 | Johnson, Jr. | ........ | G06F 11/3466 702/186 |

\* cited by examiner

*Primary Examiner* — Ranodhi Serrao
(74) *Attorney, Agent, or Firm* — FisherBroyles, LLP

(57) ABSTRACT

The disclosure is directed to benchmarking a server computer ("server"), e.g., a storage system of the server. The process can benchmark a candidate server using data from a production server that is handling live traffic of an application, e.g., a social networking application. The process includes collecting, from the production server, production data that is indicative of a workload of the production server, and generating a benchmark program using the production data. Upon execution of the benchmark program, the candidate server is made to process a workload generated based on the production data. The benchmark program records the performance of the candidate server, which is indicative of a performance of the candidate server in processing a workload similar to the production data. The performance results can be used in determining whether to upgrade the configuration of the production server to that of the candidate server, e.g., to improve performance.

19 Claims, 6 Drawing Sheets

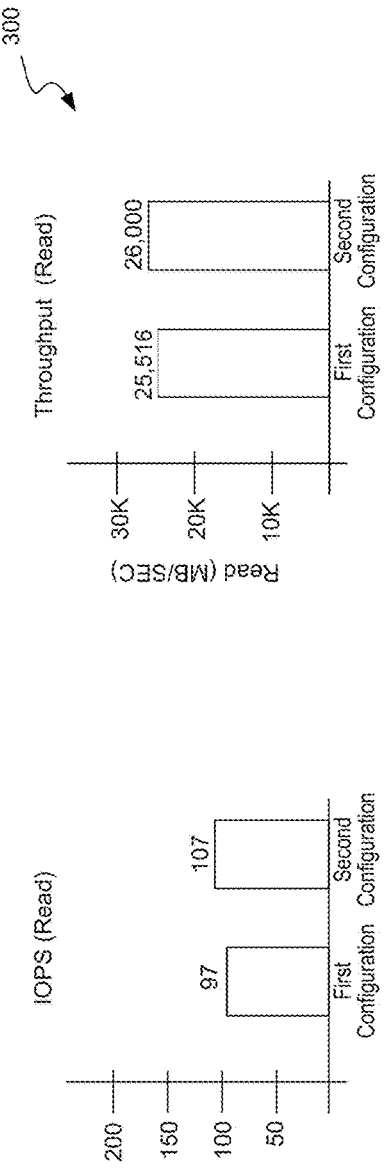
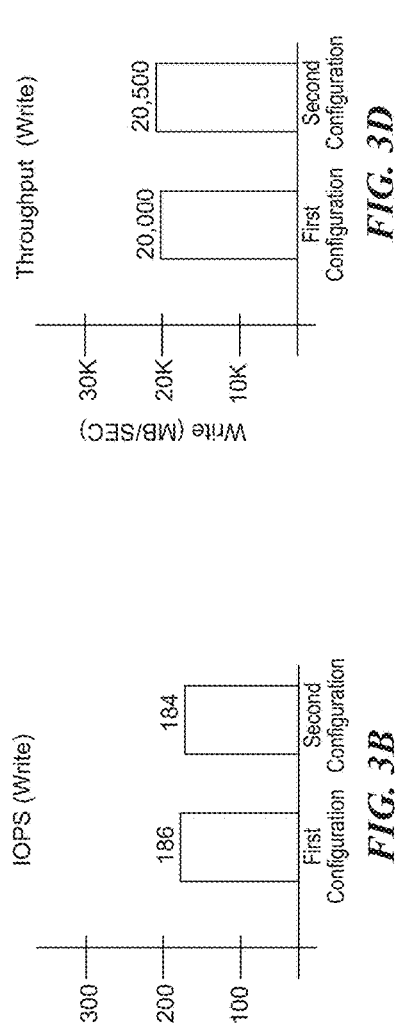

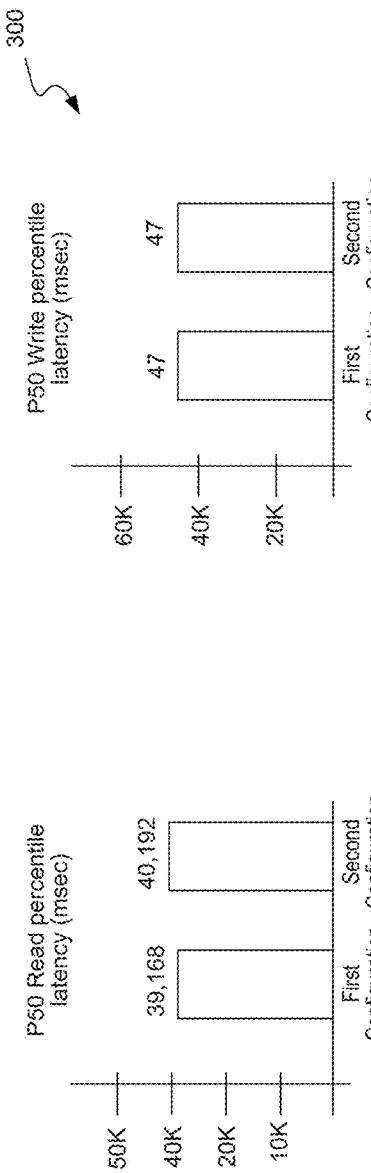
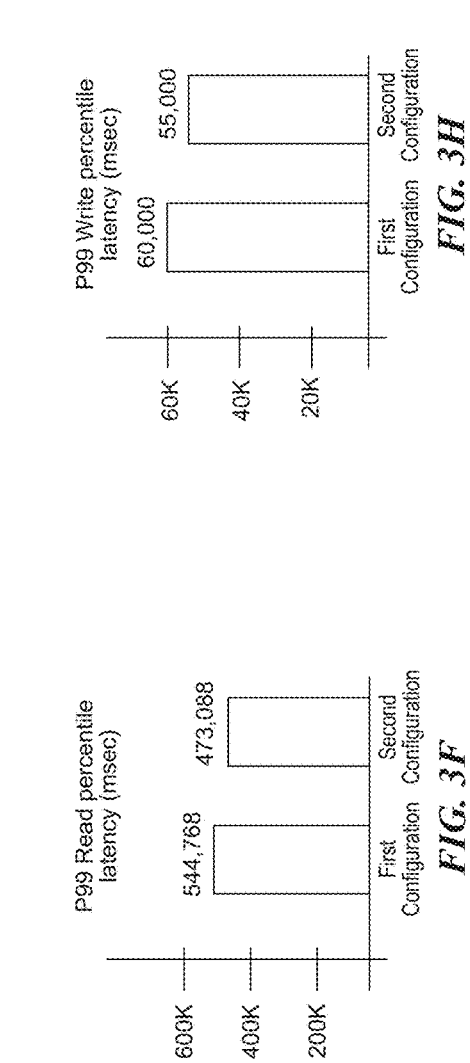

US 10,382,311 B2

BENCHMARKING SERVERS BASED ON PRODUCTION DATA

BACKGROUND

Benchmarking is a process for assessing the relative performance of a computer system by running a number of tests against it. Benchmarking is usually associated with assessing performance characteristics of computer hardware, for example, a CPU, and computer software. Software benchmarks are, for example, run against compilers or database management systems. Benchmarks provide a method of comparing the performance of various subsystems across different chip/system architectures.

Benchmarks are designed to mimic a particular type of workload on a component or system. Current benchmarking techniques do not use real-world data to benchmark systems. Such benchmarking techniques may not provide accurate performance results of the systems, and often, the performance of the system when deployed into a production environment to handle real-world data varies from, e.g., is inferior to, the performance determined by the benchmarking techniques.

Some benchmarking techniques do use real-world data to overcome the above problem of inaccurate performance results. However, such benchmarking techniques typically employ inefficient benchmark generation techniques and are difficult to use. For example, such benchmark generation techniques require physical access to a production server, e.g., a server that handles live traffic, to obtain the real-world data. Obtaining physical access to the production server can sometimes be impossible and/or inconvenient and can result in a significant delay in obtaining the production data. Further, if the benchmarks may have to be generated repeatedly for various production data, e.g., at various times of the day, obtaining the production data is not only challenging but can be an impossible task.

Further, a format in which the performance results are generated by current benchmarking techniques is often not easy to interpret. They also may not provide a comparison between the performances of various systems that are benchmarked. Such representation of the performance results may not facilitate in making informed decisions in selecting one system over the other.

BRIEF DESCRIPTION OF THE DRAWINGS

FIG. 3A illustrates a graph depicting a number of read operations processed by storage systems of two different configurations, consistent with various embodiments.

FIG. 3B illustrates a graph depicting a number of write operations processed by storage systems of two different configurations, consistent with various embodiments.

FIG. 3C illustrates a graph depicting a read data throughput of storage systems of two different configurations, consistent with various embodiments.

FIG. 3D illustrates a graph depicting a write data throughput of storage systems of two different configurations, consistent with various embodiments.

FIG. 3E illustrates a graph depicting a read latency of storage systems of two different configurations at $50^{th}$ percentile, consistent with various embodiments.

FIG. 3F illustrates a graph depicting a read latency of storage systems of two different configurations at $99^{th}$ percentile, consistent with various embodiments.

FIG. 3G illustrates a graph depicting a write latency of storage systems of two different configurations at $50^{th}$ percentile, consistent with various embodiments.

FIG. 3H illustrates a graph depicting a write latency of storage systems of two different configurations at $99^{th}$ percentile, consistent with various embodiments.

DETAILED DESCRIPTION

Figure 1:
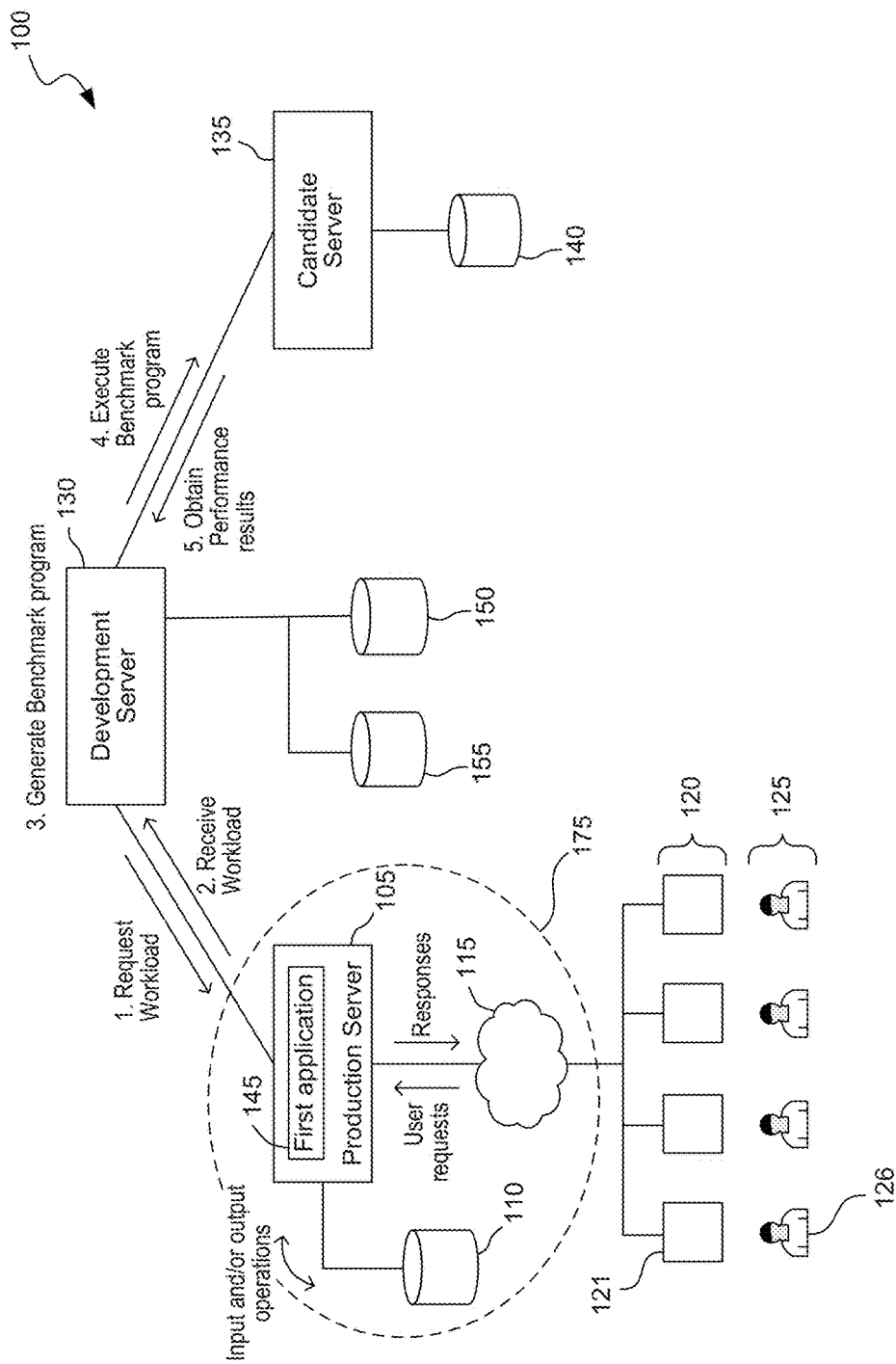
FIG. 1 is a block diagram of an environment in which the disclosed embodiments can be implemented.

Embodiments are disclosed for benchmarking various hardware and/or software configurations ("configurations") of computer systems. For example, the disclosed embodiments can be used to benchmark a storage system of a server computer ("server"). The disclosed embodiments employ a benchmarking process that can benchmark a candidate server using real-world data. The benchmarking process can collect the real-world data from a production server which is handling live traffic of an application, e.g., data access requests from users of the application, and generate a benchmark program using the real-world data that can be executed on the candidate server. The benchmarking process then executes the benchmark program at the candidate server to generate performance results of the candidate server. The performance results can be indicative of a performance of the candidate server in processing a load similar to that of the real-world data collected from the production server. In some embodiments, the performance results can be used to determine whether or not to change a configuration of the production server to that of the candidate server in order to improve a performance of the production server.

In some embodiments, the application executing on the production server can be a social networking application and the real-world data can be data associated with the data access requests from the users of the social networking application. A workload of the production server can be a function of input and/or output (I/O) operations, also referred to as read and/or write (R/W) operations, performed by the production server. A performance of the production server can depend on a performance of a storage system associated with the production server, e.g., since the production server processes a significant number of I/O operations. In some embodiments, the performance of the storage system is a function of a configuration of the storage system, e.g., a software configuration and/or a hardware configuration. For example, the performance of a storage system implementing a redundant array of independent disks (RAID) solution can be different from a storage system that does not implement the RAID solution. In another example, the performance of different storage systems implementing different RAID solutions can be different. In yet another example, the performance of a storage system implemented using solid state drives (SSDs) can be different from a storage system implemented using hard-disk drives (HDDs).

A user, e.g., an administrator of the social networking application, can generate a benchmark program using the workload of the production server and execute the benchmark program at a candidate server, which has a storage system of a specified configuration. The benchmark program generates a performance result of the candidate server, which the administrator may use for further analysis in determining whether or not to change the configuration of the production server similar to that of the candidate server. In some embodiments, since the benchmark program executed at the candidate server is generated using the workload of the production server, the performance results of the candidate server is indicative of its performance in processing a workload similar to the one processed by the production server. As such, the performance results can be more accurate and/or relevant to an environment in which the candidate server or a configuration of the candidate server is going to be implemented in.

In some embodiments, the benchmark program can be used to benchmark multiple candidate servers having different storage system configurations. The administrator may compare the performance results of various candidate servers and may choose a configuration that is similar to one of the candidate servers or that is a combination of one or more of the candidate servers. In some embodiments, the performance results include a number of performance parameters of the storage system, e.g., a read latency, a write latency, a data throughput and a number of I/O operations processed in a specified duration by the storage system. In some embodiments, the performance results can be represented graphically, e.g., as a bar graph, a line graph.

The benchmarking process employs various components, e.g., a benchmark (BM) worker component, a BM controller component, a BM repository and a results repository. The components can be distributed across various servers, e.g., a production server based on a workload of which a benchmark program is to be generated, a non-production server, e.g., a development server that facilitates the generation of the benchmark program, and a candidate server that is to be benchmarked using the benchmark program. In some embodiments, the BM controller component is implemented at the development server, and the BM worker component is implemented at the production server and the candidate server. The BM controller component requests a BM worker component at the production server to initiate a trace program for capturing workload information, e.g., data regarding various I/O operations, on the production server. The BM worker component at the production server executes the trace program to record the I/O operations being processed by the production server. The trace program continues to record the I/O operations until the trace program is terminated. Upon termination of the trace program, the BM controller component receives the workload data, generates a benchmark program using the workload data, and stores the benchmark program in the BM repository. In some embodiments, the BM repository can be implemented using one or more persistent storage media.

The BM controller component can then request the BM worker component at the candidate server to execute the benchmark program at the candidate server. Upon execution, the benchmark program simulates the workload of the production server at the candidate server and records a performance of the candidate server in processing the workload. The BM worker component transmits the performance results to the BM controller component, which can further store the performance results in a results repository. In some embodiments, the results repository can be implemented using one or more persistent storage media. The results repository can be accessed by any of the development servers. Further, the performance results can be visualized using a graphical user interface (GUI). The GUI can display the performance results of various candidate configurations for the same workload, which can facilitate the administrator in making a decision to implement one or the other configurations in the production server.

In some embodiments, the advantages of the disclosed embodiments include: automated trace collection of the workload at the production server, elimination of the need to have a physical access to the production server, automated workload data to benchmark program conversion, automated benchmark program execution at the candidate server, centralized storage of the performance results, and storing configuration information of the candidate server in association with the performance results of the candidate server.

Turning now to the figures, FIG. 1 is a block diagram of an environment 100 in which the disclosed embodiments can be implemented. The environment 100 includes a production server 105 on which a first application 145 is implemented. The first application 145 is a live application, e.g., an application that manages real-world data (also referred to as "production data"). The first application 145 is accessible by and processes data access requests of a number of users, e.g., users 125. In some embodiments, the first application 145 is considered to be a live application if the application is accessible by any of the users who were intended to be provided access to. In some embodiments, an application goes through various cycles of software development. For example, the first application 145 is developed in a development phase, tested for errors and/or for quality in one or more test phases, and launched to handle real-world data, e.g., by making it accessible to all of the intended users, in a production phase. In some embodiments, in phases other than the production phase, the first application 145 is only accessible by a closed group of users and not by all of the intended set of users. For example, the first application 145 can be accessible only to developers of the application in a development phase, to testers of the application in a test phase and to any or all of the intended set of users in the production phase.

Typically, the number of users the first application 145 is accessible to in the production phase is significantly large compared to the users than that during the other phases. Further, the data traffic pattern associated with the first application 145 in the production phase is representative of a workload of the production server 105 and/or the first application 145. The data traffic pattern associated with the first application 145 in phases other than the production phase may not be representative of the workload of the production server 105 and/or the first application 145, e.g., as the application is accessible only to a closed group of users in which the number of users is significantly less compared to the number of intended users.

In some embodiments, the first application 145 is a social networking application and the users 125 can be members of the social networking application. Examples of the production data can include comments, messages, videos, images, etc., posted by the users 125. The users 125 can access the first application 145 using client devices 120 and via communication network 115. A client device 121 can be any computing device that is capable of accessing the first application 145, e.g., a desktop, a laptop, a table PC, a smartphone, a mobile phone, a wearable device. The first application 145 handles various RAN operations, e.g., data access requests from the users 125. The production server 105 can store data associated with the users 125 in a storage system, e.g., storage system 110. The first application 145 can use the storage system 110 to store data that can be used to serve a read request and/or a write request from a user, e.g., a user 126. For example, when the user 126 requests comments, messages and/or images posted by friends of the user 126, the first application 145 can obtain the requested data from the storage system 110. Similarly, the first application 145 can store the data provided as part of the write request at the storage system 110. The storage system 110 can be implemented using a database management system and one or more persistent storage media.

In some embodiments, the first application 145 can be deployed at a number of production servers similar to the production server 105, e.g., in order to handle requests from the large number of users 125 efficiently. The production servers and their associated storage systems, including the production server 105 and the storage system 110, together form a production environment 175. The production environment 175 contains the necessary infrastructure, e.g., hardware and/or software, for facilitating the users 125 to use the first application 145. The production servers can have their own associated storage systems, e.g., similar to the storage system 110, and/or share access to a distributed storage system. In some embodiments, the storage system 110 can be configured as the distributed storage system. In some embodiments, the number of production servers in the production environment 175 can be increased, e.g., as the number of users 125 increases and/or a workload of the first application 145 increase.

The environment 100 includes a development server 130 that can be used for various purposes, including developing the first application 145. The development server 130 can also be used for testing the first application 145. The first application 145 may not be accessible by the users 125 unless it is deployed to the production server 105, e.g., from the development server 130. The access to the development server 130 can be restricted to a closed group of users, e.g., developers of the first application 145.

The production server 105 and the development server 130 can have different configurations, e.g., software and/or hardware configurations. In some embodiments, the configuration of the production server 105 is determined as a function of various factors, e.g., an expected workload of the first application 145, which can be a function of a number of the users accessing the first application 145; an intended efficiency of the production server 105 and/or the first application 145; and costs associated with providing a specified configuration, e.g., cost of a specified processor, a storage system. A user, e.g., an administrator associated with the production environment 175 and/or the first application 145, can change the configuration of the production server 105 for various reasons, e.g., to handle the increasing workload of the first application 145, a specified hardware technology associated with the production server 105 becoming obsolete, etc.

In some embodiments, a performance of the production server 105, e.g., a response time—time taken to respond to a read and/or a write request from the users 125, depends on the configuration of the storage system 110. For example, an SSD-based storage system 110 can be faster than a HDD-based storage system 110 since a read and/or write latency associated with SSDs are lesser than that of the HDDs. In another example, the response time of the storage system 110 implemented using RAID can be different from that of the storage system 110 not implemented using RAID. Accordingly, different configurations can provide different performance results. The administrator can benchmark a candidate configuration and then decide whether to upgrade the production server 105 to the candidate configuration based on the benchmark results.

The environment 100 includes a candidate server 135 that is to be benchmarked. The candidate server 135 includes a candidate storage system 140 that is of a specified configuration. The specified configuration of the candidate storage system 140 can be different from the configuration of the storage system 110. In some embodiments, benchmarking the candidate server 135 includes benchmarking the candidate storage system 140. A benchmark program of the disclosed embodiments facilitates benchmarking the candidate storage system 140.

The development server 130 can perform the benchmarking of the candidate server 135. In some embodiments, benchmarking the candidate server 135 using a workload similar to that processed by the production server 105 enables obtaining performance results that is more accurate and indicative of the performance of the candidate server 135 if it were to be deployed in the production environment 175. The development server 130 can facilitate the generation of the benchmark program using the workload of the production server 105.

The development server 130 can request the production server 105 to provide workload data that is indicative of the workload associated with the production server 105. In some embodiments, the workload associated with the production server 105 can be a function of the read and/or write requests, e.g., I/O operations, processed by the production server 105. The production server 105 transmits the workload data to the development server 130. The workload data includes various data, e.g., a number of read operations processed by the production server 105, a number of write operations processed by the production server 105, a size of the data in the R/W operations, a storage location of the data associated with the R/W operations, a time at which the R/W operation is received, or a sequence of the R/W operations. Further, the workload data may not include the actual data associated with the R/W operations processed by the production server 105.

After the development server 130 receives the workload data, the development server 130 generates a benchmark program using the workload data. In some embodiments, the development server 130 can use known benchmark generation methods to generate the benchmark program. The development server 130 transmits the benchmark program to the candidate server 135 and executes the benchmark program at the candidate server 135. In executing the benchmark program, the candidate server 135 is made to process a workload similar to that of the production server 105 and the benchmark program generates performance results of the candidate server 135, which is indicative of the performance of the candidate server 135 in processing the workload. In some embodiments, the performance results include a performance of the candidate storage system 140 in processing the workload. The performance of the candidate storage system 140 can be measured using one or more storage performance parameters, e.g., a read latency of the candidate storage system 140, a write latency of the candidate storage system 140, a number of I/O operations processed per a specified duration, and a data throughput.

The performance results of the candidate server 135 can be stored in a results repository, e.g., results repository 150, that is accessible by various development servers. In some embodiments, the development server 130 also stores a configuration of the candidate server 135 in association with the performance results of the candidate server 135. In some embodiments, the development server 130 also facilitates generating a GUI for representing the performance results of the candidate server 135. The performance results displayed in the GUI can also include a link, e.g., a hyperlink, which when selected by the user, displays the configuration information of the candidate server 135. The GUI can also present a comparison between various candidate servers and/or between the production server 105 and other candidate servers, e.g., candidate server 135.

The development server 130 can also store the benchmark program in a benchmark repository, e.g., BM repository 155. The BM repository 155 can store a number of benchmark programs, e.g., that are generated using different workloads of the production server 105. This can be helpful, e.g., in a scenario where a specified benchmark program is to be executed at a number of candidate servers or different benchmark programs are to be executed at a candidate server. The development server 130 can retrieve the specified benchmark program from the BM repository 155 and execute the specified benchmark program at a candidate server. The performance results so generated can be more indicative of the performance of the candidate server in processing the workload using which the corresponding benchmark program is generated.

The above described benchmarking process can facilitate in generating a benchmark program quickly, that is accurate and that generates accurate performance results. In some embodiments, the benchmarking can be performed quickly because the benchmarking process is automatic and needs minimum to no human intervention. For example, the development server 130 can initiate the collection of workload data from the production server 105 based on an automatic trigger or a manual trigger, e.g., initiated by a human such as the administrator. The automatic trigger can be based on various factors, e.g., a specified schedule, workload of the production server 105 exceeding a specified threshold, etc. Continuing with the above example, the generation of the benchmark program can also be automatic. The development server 130 can automatically generate the benchmark program in response to receiving the workload data from the production server 105. After the benchmark program is generated, the development server 105 can automatically transfer the benchmark program to the candidate server 135 and invoke the execution at the candidate server 135. Further, upon the completion of the execution of the benchmark program, the performance results are stored at the results repository 150 automatically. Accordingly, the process of benchmarking using the disclosed embodiments is quick.

Next, the performance results generated by the benchmarking program are also accurate. Since the benchmark program is generated using the workload of the production server 105, the performance results generated for the candidate server 135 is indicative of the performance of the candidate server 135 in processing a workload similar to that of the production server 105. The performance results indicate a performance of the candidate server 105 if it were to be deployed in the production environment 175. Accordingly, the performance results generated by the benchmark program are accurate.

Further, as workload conditions vary in the production environment 175, various benchmark programs can be generated in order to measure the performance of the candidate server 135 for those changing workload conditions. For example, if the workload is significantly high on Fridays from 3:00 pm to 9:00 pm, then the disclosed embodiments can be configured to capture workload data from the production server 105 during that time, generate a benchmark program using that workload data, and then execute the benchmark program at the candidate server 135. The performance results of the candidate server 135 so generated are a more accurate indication of the performance of the candidate server 135 in processing various workloads that are typical in the production environment 175.

Further, the benchmark program generated is also accurate. In some embodiments, the accuracy of the benchmark program can be tested by executing the benchmark program on a candidate server having a configuration similar to that of the production server 105. For example, a benchmark program, which is generated using a specified workload, e.g., a workload of the production server 105, can be executed at the production server 105 to obtain the performance results of the production server 105. Next, the benchmark program is executed at the candidate server 135 having a configuration similar to that of the production server 105. The performance results of the production server 105 can be compared with that of the candidate server to determine the accuracy of the benchmark program. If the accuracy of the benchmark program is not within a specified range, the benchmark program can be fine-tuned in order to obtain the accuracy within the specified range.

Figure 2:
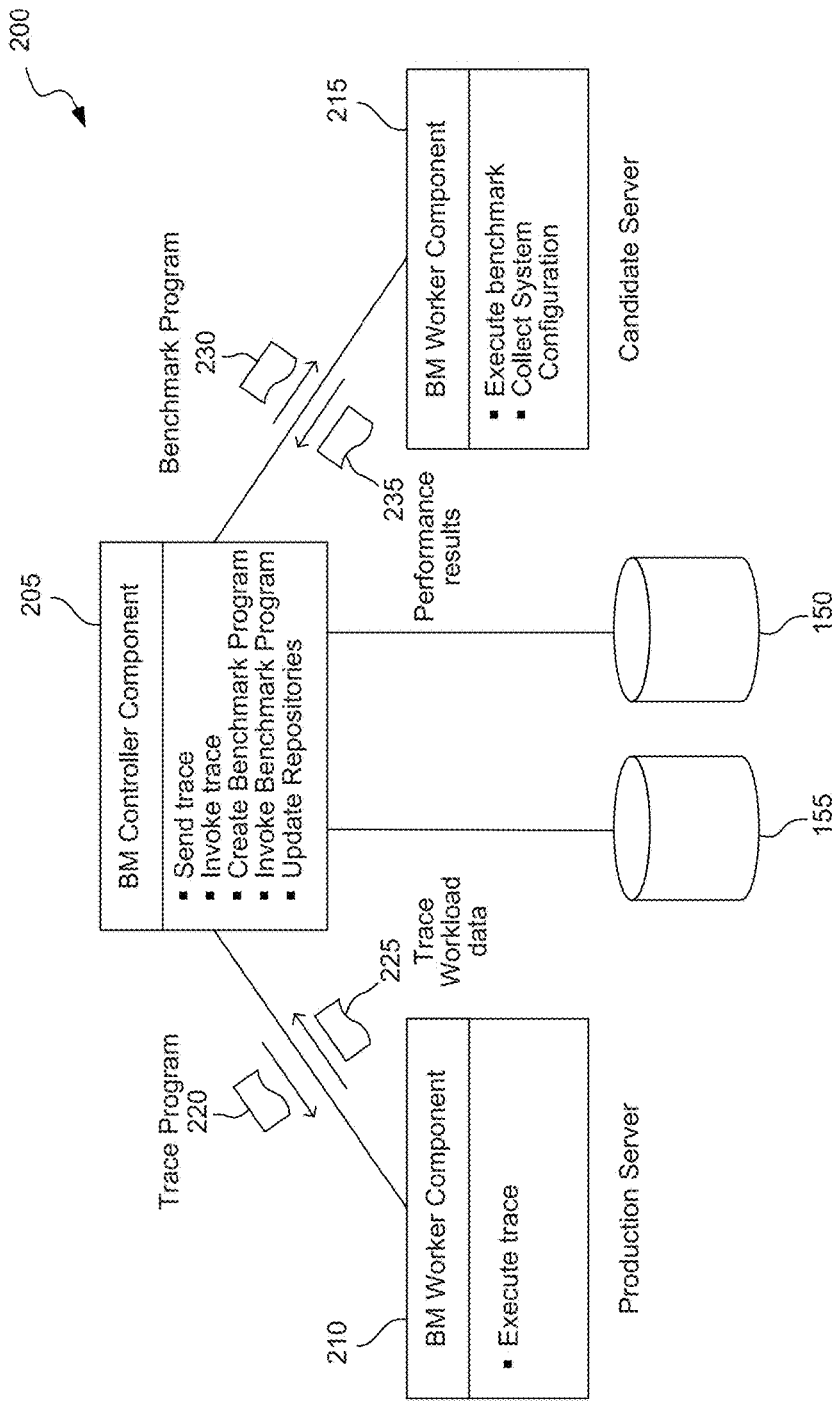
FIG. 2 is a block diagram of a benchmarking system, consistent with various embodiments.

The disclosed embodiments for benchmarking can be implemented as a distributed computing system. FIG. 2 is a block diagram of a benchmarking system, consistent with various embodiments. In some embodiments, the benchmarking system 200 can be implemented as a distributed computing system. In some embodiments, the benchmarking system 200 includes a first BM worker component 205, a BM controller component 210, a second BM worker component 215, the BM repository 155 and the results repository 150. The components can be distributed across various servers, e.g., the production server 105, the development server 130, and the candidate server 135. In some embodiments, the BM controller component 205 is implemented at the development server 130, and the first BM worker component 210 is implemented at the production server 105 and the second BM worker component 215 is implemented at the candidate server 135. In some embodiments, if the production environment 175 has many production servers, then a BM worker component is implemented in each of the production servers. In some embodiments, if many candidate servers are being benchmarked, then a BM worker component is implemented in each of the candidate servers.

The BM controller component 205 facilitates various processes, e.g., sending a trace program 220 to the production server 105 to capture workload data 225, invoking the execution of the trace program 220, creating a benchmark program 230 based on the workload data 225, sending the benchmark program 230 to the candidate server 135, invoking the execution of the benchmark program 230 at the candidate server 135 and updating the results repository 150 with the performance results 235 of the candidate server 135.

The first BM worker component 210 at the production server 105 facilitates the execution of the trace program 220 and collection of workload data of the production server 105.

The second BM worker component 215 at the candidate server 135 facilitates the execution of the benchmark program 230 and generation of the performance results 235 upon execution of the benchmark program 230.

The BM controller component 205 can request the first BM worker component 210 at the production server 105 to execute the trace program 220 for capturing workload data 225, e.g., data regarding various I/O operations, of the production server 105. In some embodiments, the BM controller can trigger the execution of the trace program 220 based on a trigger. For example, the trigger can be based on a specified date, day and/or time, a specified time interval, the workload of the production server 105 exceeding a specified threshold, etc. In another example, the execution of the trace program 220 can be triggered manually, e.g., by the administrator of the environment 100. The first BM worker component 210 executes the trace program 220 to record the I/O operations being processed by the production server 105. The trace program 220 continues to record the I/O operations until the trace program 220 is terminated. Upon termination of the trace program 220, the first BM worker component 210 sends the workload data 225 to the BM controller component.

In some embodiments, the workload data 225 includes at least one of a number of read operations processed by the production server 105, a number of write operations processed by the production server 105, a size of the data in the R/W operations, a storage location of the data associated with the R/W operations, a time at which the R/W operation is received, or a sequence of the R/W operations. Further, the workload data 225 may not include the actual data associated with the R/W operations processed by the production server 105.

In some embodiments, the development server 130 can obtain the workload data 225 without having a physical access to production server 105. The BM controller component 205 can remotely log into the first application 145, e.g., using access credentials of the first application 145, and configure the production server 105 to deploy/execute a portion of the benchmarking system 200, e.g., the first BM worker component 210. In some embodiments, the BM controller component 205 uses a configuration management tool, e.g., at the development server 130, to configure the production server 105 to deploy the first BM worker component 210. The configuration management tool can facilitate creating recipes that help in managing the applications and utilities, e.g., the first BM worker component 210, at the production server 105 and how they are to be configured. These recipes can describe a series of resources that should be in a particular state: packages that should be installed, services that should be running, or files that should be written. Once the production server 105 is configured, the BM controller component 205 can send and/or invoke the trace program 220 at the production server 105.

After the BM controller component 205 receives the workload data 225 from the first BM worker component 210, the BM controller component 205 generates the benchmark program 230 using the workload data 225. In some embodiments, the BM controller component 205 uses known benchmark generation techniques to generate the benchmark program 230. The BM controller component also stores the benchmark program 230 in the BM repository 155.

The BM controller component 205 can send the benchmark program 230 to the second BM worker component 215 at the candidate server 135 and request the second BM worker component 215 to execute the benchmark program 230. Upon execution, the benchmark program 220 simulates the workload of the production server 105 at the candidate server 135, e.g., by replaying the I/O operations recorded at the production server 105 as part of the workload data 225, and generates the performance results 235 of the candidate server 135 in processing the workload. The second BM worker component 215 then transmits the performance results 235 to the BM controller component 205, which can further store it in the results repository 150.

In some embodiments, the performance results 235 include information regarding a performance of the candidate storage system 140. The performance of the candidate storage system 150 can be expressed using a number of performance parameters, e.g., a read latency, a write latency, a data throughput and a number of I/O operations processed in a specified duration by the candidate storage system 140.

Further, the performance results 235 can be visualized using a GUI. For example, the performance results 235 can be represented graphically, e.g., as a bar graph, a line graph. The GUI can present the performance results of a single candidate server, e.g., the candidate server 135, or a comparison between performances of various candidate servers, or a comparison between the performances of a candidate server, e.g., the candidate server 135, and the production server 105.

FIGS. 3A-3H is an example 300 depicting performance results of two servers graphically, consistent with various embodiments. In the example 300, the performance results of the first configuration can be performance results of a storage system of the production server 105 and the performance results of the second configuration can be of the candidate storage system 140 of the candidate server 135. In other embodiments, the first configuration and the second configuration of the example 300 can be of storage systems of two different candidate servers as well.

FIG. 3A illustrates a graph depicting a number of read operations processed by storage systems of two different configurations, consistent with various embodiments. The number depicted in the graph can be number of read operations processed per second.

FIG. 3B illustrates a graph depicting a number of write operations processed by storage systems of two different configurations, consistent with various embodiments. The number depicted in the graph can be a number of write operations processed per second.

FIG. 3C illustrates a graph depicting a read data throughput of storage systems of two different configurations, consistent with various embodiments. The read data throughput can be measured as a number of megabytes read per second.

FIG. 3D illustrates a graph depicting a write data throughput of storage systems of two different configurations, consistent with various embodiments. The write data throughput can be measured as a number of megabytes written/stored per second.

FIG. 3E illustrates a graph depicting a read latency of storage systems of two different configurations at $50^{th}$ percentile, consistent with various embodiments. The read latency can be measured in milliseconds.

FIG. 3F illustrates a graph depicting a read latency of storage systems of two different configurations at $99^{th}$ percentile, consistent with various embodiments. The read latency can be measured in milliseconds.

FIG. 3G illustrates a graph depicting a write latency of storage systems of two different configurations at $50^{th}$ percentile, consistent with various embodiments. The write latency can be measured in milliseconds.

FIG. 3H illustrates a graph depicting a write latency of storage systems of two different configurations at $99^{th}$ percentile, consistent with various embodiments. The write latency can be measured in milliseconds.

The performance parameters depicted in FIGS. 3A-3H are just examples and various other performance parameters can be depicted. Further, the performance parameters can be depicted in various other graphical formats.

Figure 4:
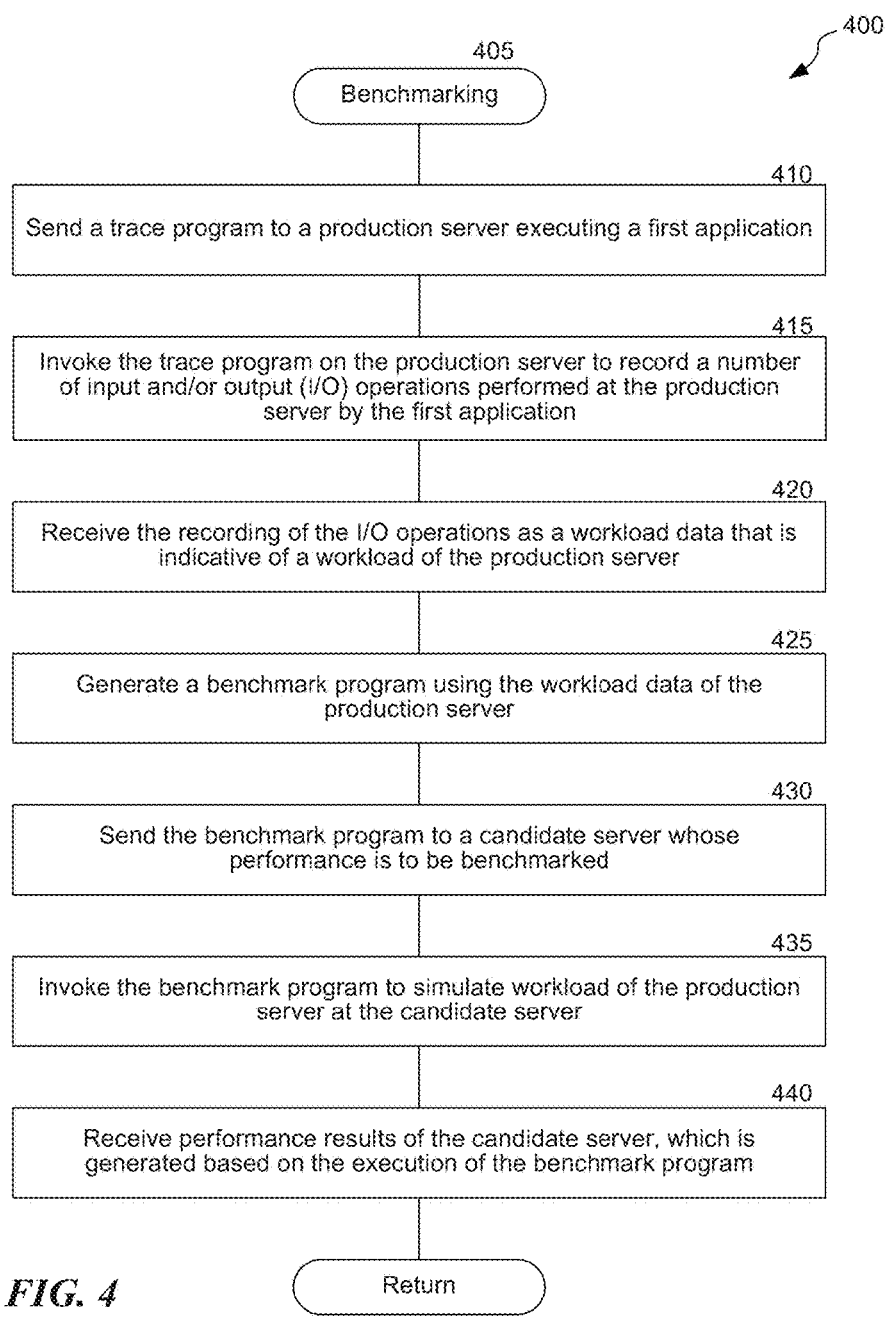
FIG. 4 is a flow diagram of a process of benchmarking a candidate server, consistent with various embodiments.

FIG. 4 is a flow diagram of a process 400 of benchmarking a candidate server, consistent with various embodiments. In some embodiments, the process 400 may be executed in the environment 100 of FIG. 1 and using the benchmarking system 200 of FIG. 2. The process 400 begins at block 405, and at block 410, the BM controller component 205 sends the trace program 220 to the production server 105 executing the first application 145 to collect information regarding a workload of the production server 105. In some embodiments, the workload of the productions server 105 is a function of the R/W requests received at the production server 105 by the users 125 of the first application 145.

At block 415, the BM controller component 205 invokes the trace program 220 to record the I/O operations performed at the production server 105. In some embodiments, the trace program 220 can be invoked in response to a trigger, e.g., a specified date, day and/or time, a specified time interval, a workload of the production server 105 exceeding a specified threshold. The first BM worker component 210 at the production server 105 executes the trace program 220 and continues to record the I/O operations, e.g., workload data 225, until the trace program 220 is terminated.

At block 420, the BM controller component 205 receives the workload data, which is indicative of a workload of the production server 105.

At block 425, the BM controller component 205 generates a benchmark program 230 using the workload data 225 of the production server 105. The BM controller component 205 can use known benchmark generation methods and/or customize the known benchmark generation methods to generate the benchmark program 230 using the workload data 225.

At block 430, the BM controller component 205 sends the benchmark program 230 to the candidate server 135 whose performance is to be benchmarked. The BM controller component 205 can also store the benchmark program 230 in the benchmark repository 155.

At block 435, the BM controller component 205 invokes the benchmark program 230 at the candidate server 135. Upon execution, the benchmark program 230 simulates a workload that is similar to that of the production server 105 at the candidate server 135, e.g., by replaying the I/O operations from the workload data 225, and causing the candidate server 135 to process the workload.

At block 440, the BM controller component 205 receives the performance results of the candidate server 135 that is generated based on the execution of the benchmark program 230. The performance results of the candidate server 135 are indicative of a performance of the candidate server 135 in processing a workload similar to that of the production server 105. Accordingly, the performance results depict how the candidate server 135 would perform if the candidate server 135 were to be deployed in the production environment 175. In some embodiments, the benchmarking process 400 benchmarks a storage system, e.g., candidate storage system 140, associated with the candidate server 135, and therefore the performance results can include information associated with the performance of the candidate storage system 140.

Figure 5:
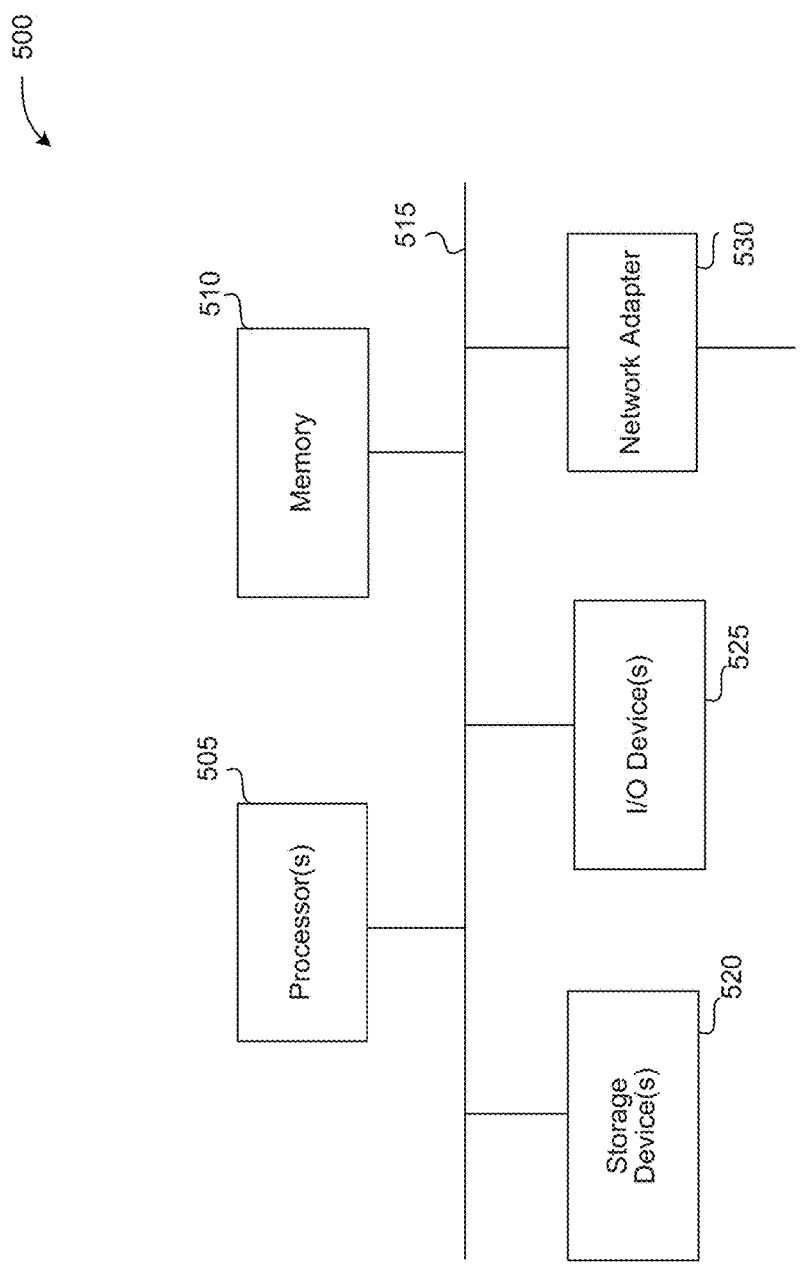
FIG. 5 is a block diagram of a processing system that can implement operations of the present invention.

FIG. 5 is a block diagram of a computer system as may be used to implement features of the disclosed embodiments. The computing system 500 may be used to implement any of the entities, components or services depicted in the examples of the foregoing figures (and any other components and/or modules described in this specification). The computing system 500 may include one or more central processing units ("processors") 505, memory 510, input/output devices 525 (e.g., keyboard and pointing devices, display devices), storage devices 520 (e.g., disk drives), and network adapters 530 (e.g., network interfaces) that are connected to an interconnect 515. The interconnect 515 is illustrated as an abstraction that represents any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 510 and storage devices 520 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 510 can be implemented as software and/or firmware to program the processor(s) 505 to carry out actions described above. In some embodiments, such software or firmware may be initially provided to the processing system 500 by downloading it from a remote system through the computing system 500 (e.g., via network adapter 530).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
    sending, from a development server computer to a production server computer, a trace program to record multiple input and/or output (I/O) operations performed by a first application deployed at the production server computer;
    invoking, by the development server computer, an execution of the trace program at the production server computer;
    recording, in response to the execution of the trace program at the production server computer, the I/O operations to generate a workload data that is representative of a workload of the production server computer;
    receiving, at the development server computer, the workload data from the production server computer;
    generating, at the development server computer and in response to receiving the workload data, a benchmark program using the workload data, the benchmark program to be used for measuring performance of one or more candidate server computers;
    executing, at the one or more candidate server computers, the benchmark program; and
    generating performance results of the one or more candidate server computers based on the benchmark program.

2. The method of claim 1, wherein generating the performance results of the candidate server computer includes generating the performance results of a storage system of the candidate server computer.

3. The method of claim 2, wherein generating the performance results includes generating information regarding a storage performance parameter of the storage system, the storage performance parameter including at least one of a read latency of the storage system, a write latency of the storage system, a data throughput of the storage system, or a number of I/O operations handled by the storage system per a specified duration.

4. The method of claim 2, wherein generating the performance results of the storage system includes generating the performance results for at least one of a software configuration or a hardware configuration of the storage system.

5. The method of claim 1, wherein sending the trace program to the production server computer includes:
    configuring the first application to be accessible by the development server computer, and
    transmitting, from the development server computer, the trace program to the production server computer after the first application provides access permission to the development server computer.

6. The method of claim 1, wherein recording the I/O operations to generate the workload data includes recording any of a type of the I/O operations, a size of data associated with the I/O operations, a storage location of the data, a time at which the I/O operations are performed, and a sequence of the I/O operations.

7. The method of claim 1 further comprising:
    determining that the workload of the production server computer has changed,
    generating a second benchmark program using a second workload data that is indicative of the changed workload of the production server computer, and
    executing the second benchmark program at the one or more candidate server computers to determine performance results of the candidate server computer based on the second benchmark program.

8. The method of claim 1, wherein executing the benchmark program at the one or more candidate server computers includes executing the I/O operations recorded at the production server computer at the one or more candidate server computers to simulate the workload of the production server computer at the one or more candidate server computers.

9. The method of claim 8, wherein executing the I/O operations at the one or more candidate server computers includes executing the I/O operations at the one or more candidate server computers in the same sequence as that on the production server computer.

10. The method of claim 1 further comprising:
    storing the performance results in a specified storage system that is configured to store performance results of the one or more candidate server computers.

11. The method of claim 10 further comprising:
    storing configuration information of the one or more candidate server computers at the specified storage system in association with their performance results.

12. The method of claim 1 further comprising:
    generating a graphical user interface that presents the performance results graphically.

13. A non-transitory computer-readable storage medium storing computer-readable instructions, the instructions comprising:
    instructions for receiving, at a development server computer and from a production server computer, a workload data that is representative of a workload of the production server computer, the workload of the production server computer resulting from multiple input and/or output (I/O) operations performed by a first application deployed at the production server computer;

instructions for generating, at the development server computer and in response to receiving the workload data, a benchmark program using the workload data, the generating performed automatically in response to receiving the workload data;

instructions for executing the benchmark program at a candidate server computer to simulate the workload of the production server computer at the candidate server computer; and instructions for generating performance results of the candidate server computer based on the benchmark program;

wherein the instructions for receiving the workload data include:
instructions for sending a trace program to the production server computer that records the input and/or output (I/O) operations, and
instructions for invoking the recording of the I/O operations at the production server computer based on a specified trigger condition.

14. The non-transitory computer-readable storage medium of claim 13, wherein the instructions for generating the performance results include:
instructions for generating the performance results of a storage system of the candidate server computer.

15. The non-transitory computer-readable storage medium of claim 14, wherein the instructions for generating the performance results of the storage system include:
instructions for generating the performance results based on at least one of a hardware configuration or a software configuration of the storage system.

16. The non-transitory computer-readable storage medium of claim 14, wherein the instructions for generating the performance results of the storage system further include:
instructions for retrieving from a specified storage system associated with the development server computer performance results of storage systems of multiple candidate server computers, and
instructions for generating a graphical user interface that presents a comparison of the performance results of the candidate server computers graphically.

17. The non-transitory computer-readable storage medium of claim 13, wherein the instructions for generating the benchmark program include:
instructions for executing the benchmark program on a first candidate server computer having a configuration similar to that of the production server computer to generate a first performance result of the first candidate server computer,
instructions for comparing the first performance result with a second performance result of the production server computer, the second performance result determined based on the workload data, and instructions for determining that the benchmark program is accurate if a variation between the first performance result and the second performance result is within a specified range.

18. A system, comprising:
a processor;
a first module configured to:
invoke a trace program at a production server computer, the trace program generating a workload data that is representative of a workload of the production server computer;
receive the workload data from the production server computer;
generate, in response to receiving the workload data from the production server computer, a benchmark program using the workload data, the benchmark program being executable at one or more candidate server computers, and
invoke the benchmark program at the one or more candidate server computers to facilitate measurement of a performance of the one or more candidate server computers in processing the workload data; and
a second module configured to:
execute the trace program at the production server computer to generate the workload data, and
execute the benchmark program at the one or more candidate server computers to generate performance results indicative of a performance of the candidate server computer in processing the workload data.

19. The system of claim 18, wherein the first module is configured to generate the benchmark program for measuring a performance of a storage system of the one or more candidate server computers.

* * * * *